United States Patent
Cheng

(10) Patent No.: US 8,963,892 B2
(45) Date of Patent: Feb. 24, 2015

(54) PEN-SHAPED INPUT DEVICE HAVING VARIABLE STIFFNESS OF WRITING TIP

(71) Applicant: KYE Systems Corp., New Taipei (TW)

(72) Inventor: Li-Kuei Cheng, New Taipei (TW)

(73) Assignee: KYE Systems Corp., New Taipei (TW)

( * ) Notice: Subject to any disclaimer, the term of this patent is extended or adjusted under 35 U.S.C. 154(b) by 85 days.

(21) Appl. No.: 13/953,719

(22) Filed: Jul. 29, 2013

(65) Prior Publication Data

US 2014/0118313 A1  May 1, 2014

(30) Foreign Application Priority Data

Oct. 30, 2012 (TW) .............................. 101140205 A

(51) Int. Cl.
G06F 3/03 (2006.01)
G06F 3/0354 (2013.01)
(52) U.S. Cl.
CPC .................................. *G06F 3/03545* (2013.01)
USPC .......................................................... 345/179

(58) Field of Classification Search
None
See application file for complete search history.

(56) References Cited

U.S. PATENT DOCUMENTS

| | | | |
|---|---|---|---|
| 4,532,376 A * | 7/1985 | Rockwell | 178/19.01 |
| 5,953,001 A * | 9/1999 | Challener et al. | 345/179 |
| 2013/0335380 A1* | 12/2013 | Griffin et al. | 345/179 |

* cited by examiner

*Primary Examiner* — Joseph Haley
(74) *Attorney, Agent, or Firm* — Guice Patents PLLC

(57) ABSTRACT

The present invention relates to a pen-shaped input device having variable stiffness of writing tip, which at least includes a support, a printed circuit board, a hollow barrel, a first rubber member, a hollow ferrite core, a linear shaft, a writing tip and a pen head, and characterized in that: a second rubber member, a switch unit and a stagger unit are installed, the switch unit is formed with at least a stop piece, wherein one of the stop pieces is formed with a hollow convex column, the hollow convex column is formed with a switch pin, when the switch pin is at a first position, the first rubber member is served to provide a first stiffness to the writing tip, when the switch pin is transversally moved to a second position, the second rubber member is served to provide a second stiffness to the writing tip.

11 Claims, 4 Drawing Sheets

PEN-SHAPED INPUT DEVICE HAVING VARIABLE STIFFNESS OF WRITING TIP

BACKGROUND OF THE INVENTION

1. Field of the Invention

The present invention relates to a pen-shaped input device having variable stiffness of writing tip, especially to a pen-shaped input device having variable stiffness of writing tip in which a switch unit and a stagger unit are installed thereby capable of providing variable stiffness to a writing tip through the staggering structure.

2. Description of Related Art

For a writing tip of a conventional digital pen, the writing tip can be altered through changing the relative locations of a ferrite core and a sensing coil, wherein a rubber member is provided for controlling the pressing pressure and recovery for this stroke. The stiffness of the rubber member of a digital board available in the market is mainly determined based on a hard-core writing instrument such as a pencil or a pen used for sketch thereby satisfying the writing tip of the mentioned pen. However, the writing stroke of the hard-core writing instrument and that of a soft-core writing instrument such as a calligraphy brush or water-painting brush are very different, so when being used in a professional manner, the user would still be provided with the writing tip similar to the hard-core writing instrument even if different type of pen is adopted, and the feedback is distinctively different from the feedback provided by the soft-core writing instrument.

Take the Taiwan Utility Model NO. M393727 titled in "Digital calligraphy brush" for example, the digital calligraphy brush includes an electrical pen, a magnetic member and a sleeve, a first end of the electrical pen is formed in a conical shape, and a second end thereof is connected to the magnetic member, the interior of the electrical pen is installed with a sensor, the sleeve is sleeved with the electrical pen with a movable manner, and the sleeve is installed with a magnetic sensor corresponding to the magnetic member, when the electrical pen is used for writing or painting, the electrical pen generates a displacement relative to the sleeve, so the distance between the magnetic sensor and the magnetic member is altered, and a corresponding signal is generated and transferred to a computer, thereby enabling the computer to calculate and simulate the size and the stroke of calligraphy writing.

Take the Taiwan Utility Model NO. M241752 titled in "Multi-module digital pen" for example, the multi-module digital pen includes a pen body having a touch control pen head, and a pen sleeve module sleeved at the outer side of the pen body; the pen sleeve module is provided with a tube, and a writing pen head used for writing and disposed at one end of the tube; after the pen sleeve module and the pen body are assembled, the action force generated during the writing pen head being used for writing can be transferred to the touch control pen head, so different writing pen head can be adopted with respect to the pen holding habit of a user, writing strokes with various width can also be provided, thereby allowing the user to have the feelings of pen stroke and pen holding similar to a real pen. However, the mentioned digital pen can only provide a fixed stiffness, such disadvantage shall be improved.

In view of the disadvantage of the mentioned digital pen, the present invention provides a pen-shaped input device having variable stiffness of writing tip for improving said disadvantage.

SUMMARY OF THE INVENTION

One primary objective of the present invention is to provide a pen-shaped input device having variable stiffness of writing tip, in which a switch unit and a stagger unit are installed thereby capable of providing variable stiffness to a writing tip through the staggering structure.

Another objective of the present invention is to provide a pen-shaped input device having variable stiffness of writing tip, in which a first rubber member and a second rubber member having different stiffness are installed thereby capable of providing a writing tip with a stiffness similar to a hard-core writing instrument and a soft-core writing instrument which allow the user to freely select and switch.

For achieving the aforesaid objectives, one technical solution provided by the present invention is to provide a pen-shaped input device having variable stiffness of writing tip, which at least includes a support, a printed circuit board, a hollow barrel, a first rubber member, a hollow ferrite core, a linear shaft, a writing tip and a pen head, a first end of the writing tip is exposed outside the pen head and a second end thereof is received in the hollow ferrite core, and characterized in that: a second rubber member, a switch unit and a stagger unit are installed, wherein the first rubber member is disposed between the switch unit and the support, the second rubber member is disposed between the switch unit and the stagger unit, and the switch unit is formed with at least a stop piece, wherein one of the stop pieces is formed with a hollow convex column, the hollow convex column is formed with a switch pin, the top of the stagger unit is formed with at least a stop block corresponding to the stop piece, wherein one of the stop blocks is formed with a stop column, when the switch pin is at a first position, the stop piece is abutted against the stop column, thereby allowing the first rubber member to provide a first stiffness to the writing tip, when the switch pin is transversally moved to a second position, the stop column and the stop piece are staggered, thereby allowing the second rubber member to provide a second stiffness to the writing tip.

For achieving the aforesaid objectives, another technical solution provided by the present invention is to provide a pen-shaped input device having variable stiffness of writing tip, which at least includes: a housing formed as hollow; a writing tip altering switch disposed in the housing, the writing tip altering switch at least includes a stagger unit, a rubber member and a switch unit, and the switch unit is enabled to be selectively abutted against the stagger unit or against the rubber member; a writing tip unit disposed in the housing, and the writing tip unit is mutually abutted with the stagger unit; and a pen head mutually connected with the housing, and the interior of the pen head is formed with a round hole thereby allowing the writing tip unit to be exposed from the round hole.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
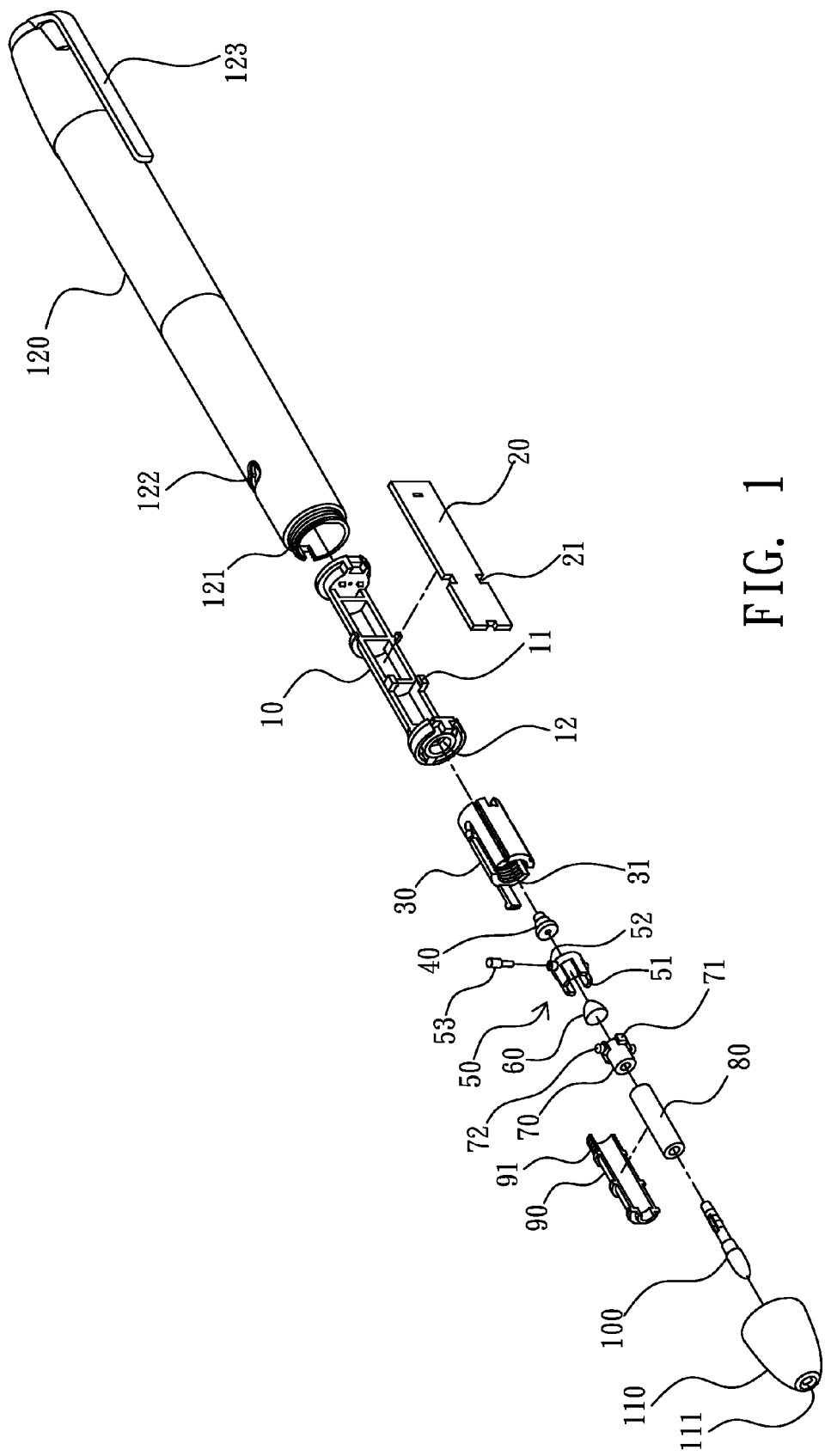
FIG. 1 is an exploded view illustrating the pen-shaped input device having variable stiffness of writing tip according to a preferred embodiment of the present invention.
Figure 2A:
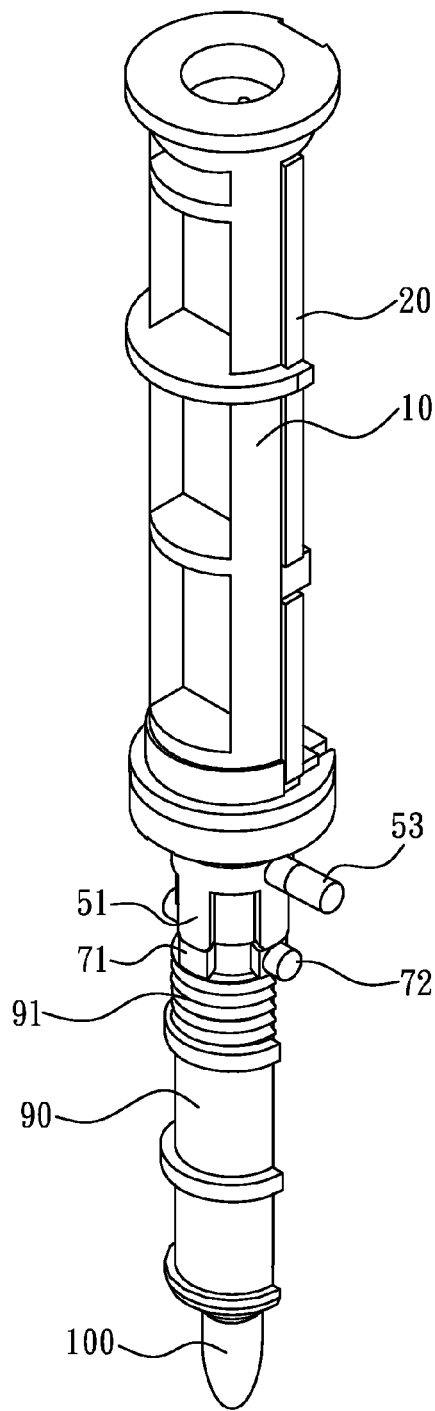
FIG. 2(a) is a schematic view illustrating the switch pin of the pen-shaped input device having variable stiffness of writing tip being at a first position according to a preferred embodiment of the present invention.
Figure 2B:
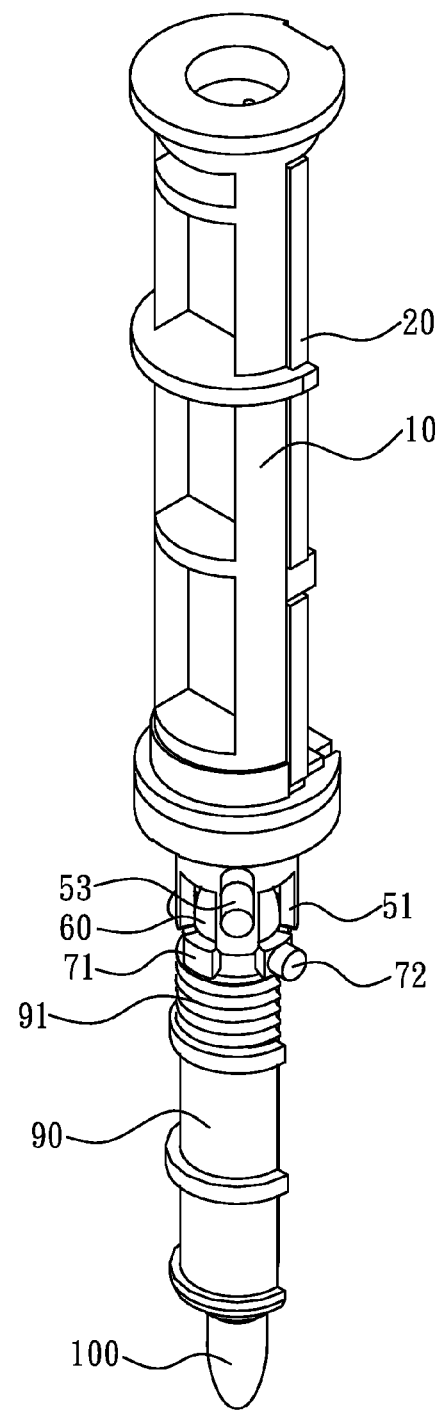
FIG. 2(b) is a schematic view illustrating the switch pin of the pen-shaped input device having variable stiffness of writing tip being at a second position according to a preferred embodiment of the present invention.
Figure 3:
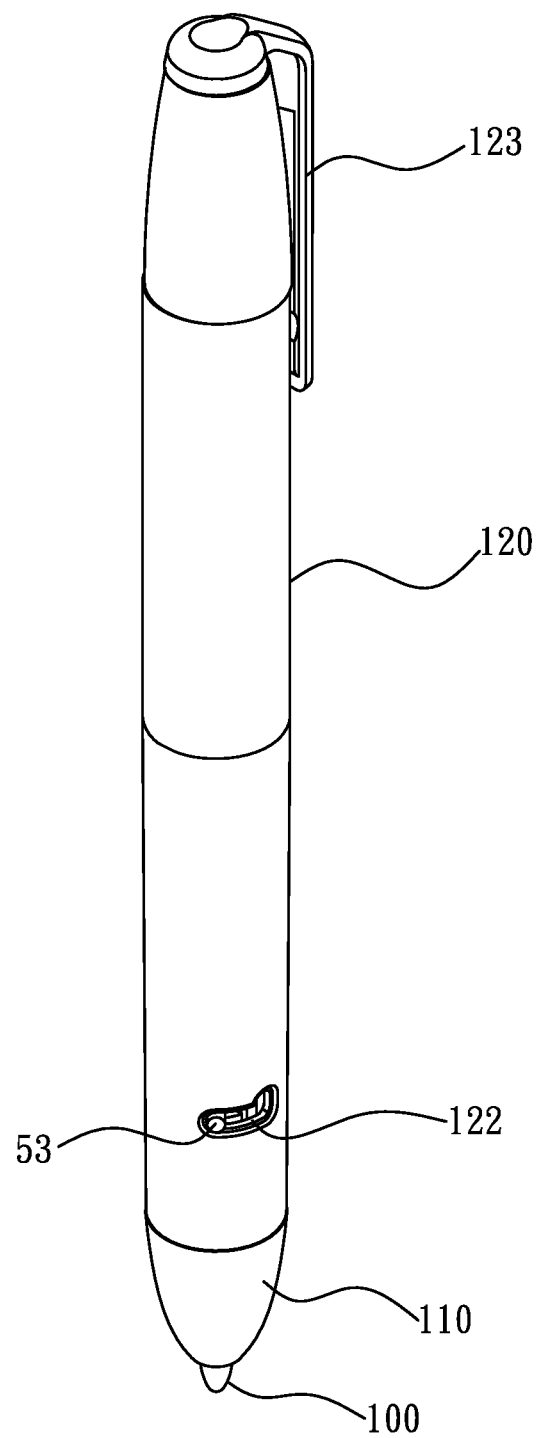
FIG. 3 is a schematic view illustrating the assembly of the pen-shaped input device having variable stiffness of writing tip according to a preferred embodiment of the present invention.
Figure 4A:
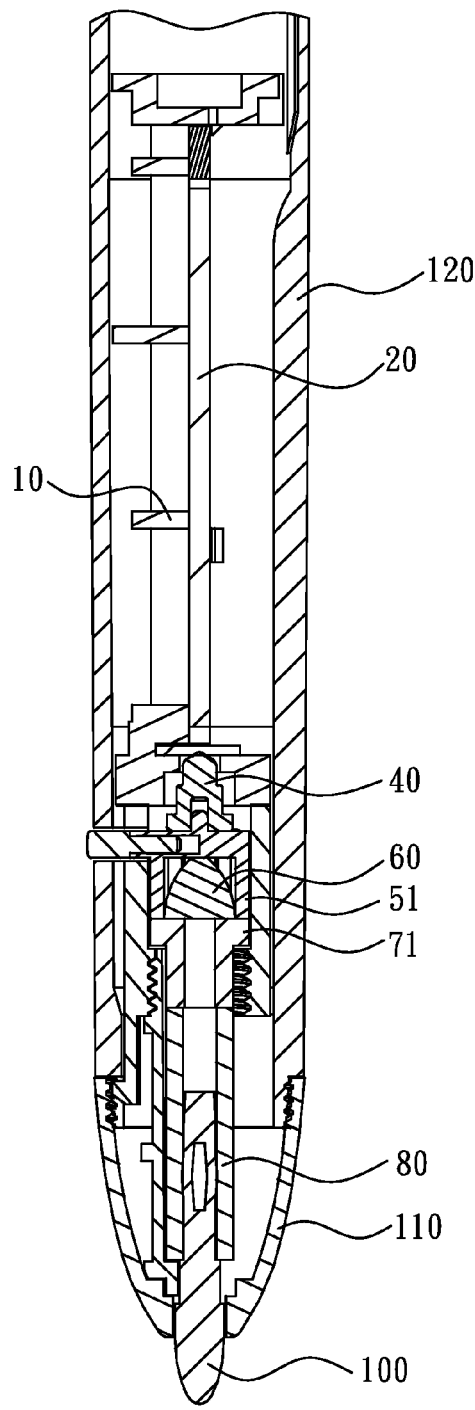
FIG. 4(a) is a cross sectional view illustrating the switch pin of the pen-shaped input device having variable stiffness of writing tip being at the first position according to a preferred embodiment of the present invention.
Figure 4B:
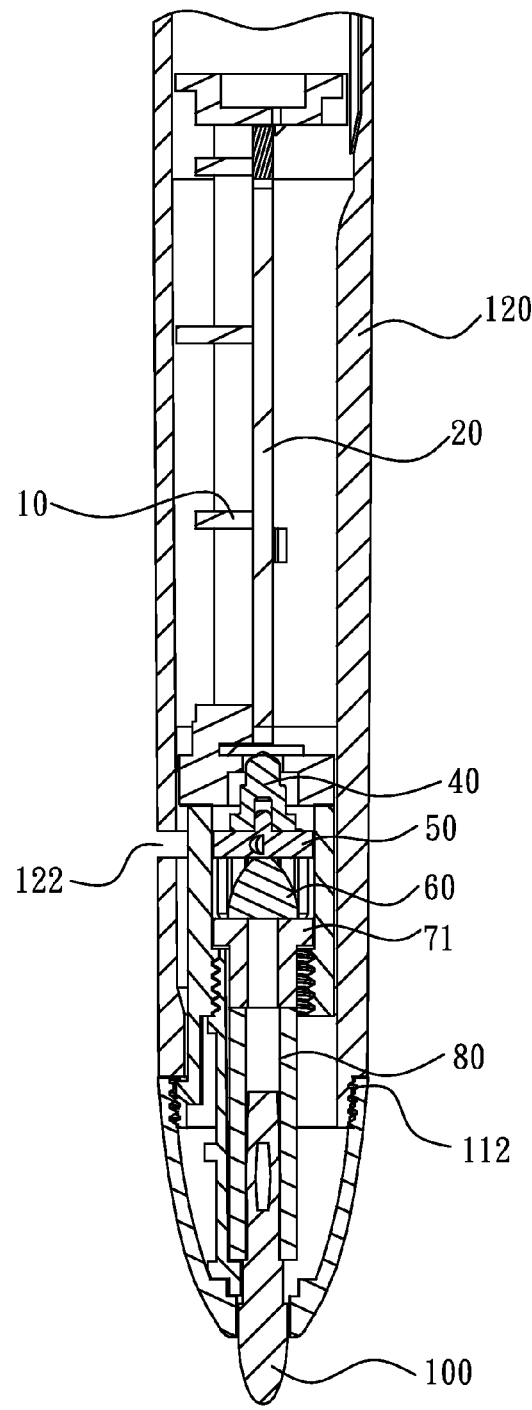
FIG. 4(b) is a cross sectional view illustrating the switch pin of the pen-shaped input device having variable stiffness of writing tip being at the second position according to a preferred embodiment of the present invention.

Referring from FIG. 1 to FIG. 4(b), wherein FIG. 1 is an exploded view illustrating the pen-shaped input device having variable stiffness of writing tip according to a preferred embodiment of the present invention; FIG. 2(a) is a schematic view illustrating the switch pin of the pen-shaped input device having variable stiffness of writing tip being at a first position according to a preferred embodiment of the present invention; FIG. 2(b) is a schematic view illustrating the switch pin of the pen-shaped input device having variable stiffness of writing tip being at a second position according to a preferred embodiment of the present invention; FIG. 3 is a schematic view illustrating the assembly of the pen-shaped input device having variable stiffness of writing tip according to a preferred embodiment of the present invention; FIG. 4(a) is a cross sectional view illustrating the switch pin of the pen-shaped input device having variable stiffness of writing tip being at the first position according to a preferred embodiment of the present invention; and FIG. 4(b) is a cross sectional view illustrating the switch pin of the pen-shaped input device having variable stiffness of writing tip being at the second position according to a preferred embodiment of the present invention.

As shown in figures, according to a preferred embodiment of the present invention, the pen-shaped input device having variable stiffness of writing tip includes: a support 10; a printed circuit board 20; a hollow barrel 30; a first rubber member 40; a switch unit 50; a second rubber member 60; a stagger unit 70; a hollow ferrite core 80; a linear shaft 90; a writing tip 100; and a pen head 110.

The support 10 is e.g. but not limited to be made of plastic, the center thereof is formed with at least a protrusion 11, the bottom thereof is formed with a chamber 12.

The printed circuit board 20 is formed with a slit 21 corresponding to the protrusion 11 thereby allowing the printed circuit board 20 to be fastened on the support 10.

The hollow barrel 30 is e.g. but not limited to be made of plastic, one end thereof is sleeved at the bottom of the support 10, the interior thereof is formed with threads 31.

The first rubber member 40 is e.g. but limited to be formed in a cylindrical shape having a gradually-reduced diameter, one end thereof, e.g. but not limited to the bottom, is disposed at the top of the switch unit 50, the other end thereof, e.g. but not limited to the top, is passed the hollow barrel 30 and abutted against the chamber 12, wherein the first rubber member 40 is provided with a first stiffness.

The switch unit 50 is e.g. but not limited to be made of plastic, and formed with at least a stop piece 51, according to this embodiment, four stop pieces 51 are adopted for illustration and shall be a limitation to the scope of the present invention, the four stop pieces 51 are arranged with equal intervals, wherein one of the stop pieces 51 is formed with a hollow convex column 52, the hollow convex column 52 is formed with a switch pin 53.

The second rubber member 60 is e.g. but not limited to be formed in a conical shape, one end thereof, e.g. but not limited to the bottom, is disposed at the top of the stagger unit 70, the other end thereof, e.g. but not limited to the top, is disposed in a space defined by the four stop pieces 51 of the switch unit 50, wherein the second rubber member 60 is provided with a second stiffness, and the first stiffness is preferably to be harder than the second stiffness.

The stagger unit 70 is e.g. but not limited to be made of plastic, one end thereof, e.g. but not limited to the top, is formed with at least a stop block 71 corresponding to the stop piece 51, according to this embodiment, four stop blocks 71 are adopted for illustration and shall not be a limitation to the scope of the present invention, the four stop blocks 71 are arranged with equal intervals, wherein at least one of the stop blocks 71 is formed with a stop column 72, according to this embodiment, the arrangement of two stop blocks 71 disposed with a diagonal manner being respectively formed with the mentioned stop column 72 is adopted for illustration and shall not be a limitation to the scope of the present invention.

One end of the hollow ferrite core 80 is abutted against the bottom of the stagger unit 70 thereby allowing the writing tip 100 to be received.

The linear shaft 90 is e.g. but not limited to be made of plastic, and disposed at one side of the hollow ferrite core 80, the top of the linear shaft 90 is formed with threads 91, thereby allowing the top of the linear shaft 90 to be fastened in the hollow barrel 30 through engaging the threads 91 and the threads 31.

The top of the writing tip 100 is received in the hollow ferrite core 80 and the stagger unit 70.

The pen head 110 is e.g. but not limited to be made of plastic, and formed with a round hole 111 allowing the other end of the writing tip 100 to be exposed, the interior of the pen head 110 is formed with threads 112.

In addition, the pen-shaped input device having variable stiffness of writing tip provided by the present invention further includes a housing 120 formed as hollow, one outer end of the housing 120 is formed with threads 121, thereby being able to be fastened in the pen head 110; moreover, the housing 120 is formed with a slide groove 122 corresponding to the switch pin 53 thereby allowing the switch pin 53 to be exposed and transversally moved; furthermore, the top of the housing 120 is provided with a pen clip 123.

As shown in FIG. 2(a) and FIG. 4(a), when the switch pin 53 is at a first position, e.g. but not limited to the right, a user downwardly applies an external force to the housing 120, so the four stop pieces 51 are enabled to be respectively abutted against the corresponding stop block 71, the top of the writing tip 100 is prevented from being in contact with the bottom of the second rubber member 60, the stagger unit 70 and the first rubber member 40 are upwardly moved, the top of the first rubber member 40 is abutted against the bottom of the support 10, so the first rubber member 40 is enabled to provide the first stiffness to the writing tip 100, wherein the first stiffness is a relatively harder stiffness.

As shown in FIG. 2(b) and FIG. 4(b), when the switch pin 53 is transversally moved to a second position, e.g. but not limited to the left, the user downwardly applies an external force to the housing 120, so the four stop pieces 51 are respectively staggered relative to the four stop blocks 71, the stop column 72 is enabled to protrude for being located between two of the stop pieces 51, and the top of the writing tip 100 is directly in contact with the bottom of the second rubber member 60, the stagger unit 70 is unable to drive the first rubber member 40 for being upwardly moved due to the staggering, thereby enabling the second rubber member 60 to provide the second stiffness to the writing tip 100. According to what has been mentioned above, the second stiffness is a relatively softer stiffness. As such, through the staggering structure established by the switch unit 50 and the stagger unit 70, the writing tip of the present invention can be provided with variable stiffness for altering the pressing pressure of the writing tip 100, thereby achieving the function of switching writing tip. Accordingly, the pen-shaped input device having variable stiffness of writing tip provided by the present invention is novel and practical in use comparing to the prior art.

Moreover, according to another embodiment, the present invention also discloses a pen-shaped input device having variable stiffness of writing tip, which at least includes: a housing 120 formed as hollow; a writing tip altering switch (not shown in figures) disposed in the housing 120, and the writing tip altering switch is installed with at least a stagger unit 70, a rubber member 60 and a switch unit 50, the switch unit 50 is enabled to be selectively abutted against the stagger unit 70 or against the rubber member 60; a writing tip unit (not shown in figures) disposed in the housing 120, and the writing tip unit is mutually abutted with the stagger unit 70; and a pen head 110 mutually connected with the housing 120, and the interior of the pen head 110 is formed with a round hole 111 thereby allowing the writing tip unit to be exposed from the round hole 111.

The housing 120 is formed as hollow, one outer end thereof is formed with threads 121 thereby being enabled to be fastened in the pen head 110, furthermore, the housing 120 is formed with a slide groove 122 corresponding to the switch pin 53 thereby allowing the switch pin 53 to be exposed and be transversally moved, moreover, the top of the housing 120 is provided with a pen clip 123.

The rubber member 60 is disposed between the stagger unit 70 and the switch unit 50.

The switch unit 50 is formed with at least a stop piece 51, and the stop piece 51 is formed with at least a switch pin 53, the stagger unit 70 is formed with at least a stop column 72, the switch pin 53 is served to selectively allow the stop piece 51 to be abutted against the stop column 72 or against the rubber member 60.

The writing tip unit at least includes: a hollow ferrite core 80 disposed in the housing 120, and the hollow ferrite core 80 is mutually abutted with the stagger unit 70; and a writing tip 100, one end thereof is exposed from the round hole 111 of the pen head 110, the other end thereof is received in the hollow ferrite core 80.

As what has been mentioned above, the pen-shaped input device having variable stiffness of writing tip provided by the present invention is installed with the switch unit and the stagger unit, thereby capable of providing variable stiffness to the writing tip through the staggering structure; and is installed with the first rubber member and the second rubber member having different stiffness, thereby capable of providing the writing tip with a stiffness similar to the hard-core writing instrument and the soft-core writing instrument which allow the user to freely select and switch thereby meeting the needs required by the user. Accordingly, the pen-shaped input device having variable stiffness of writing tip is novel and practical in use comparing to the writing tip structure of the conventional digital pen.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A pen-shaped input device having variable stiffness of writing tip, at least including:
a support, a printed circuit board, a hollow barrel, a first rubber member, a hollow ferrite core, a linear shaft, a writing tip and a pen head, a first end of said writing tip being exposed outside said pen head and a second end thereof being received in said hollow ferrite core, and characterized in that: a second rubber member, a switch unit and a stagger unit being installed, wherein said first rubber member being disposed between said switch unit and said support, said second rubber member being disposed between said switch unit and said stagger unit, and said switch unit being formed with at least a stop piece, wherein one of said stop pieces being formed with a hollow convex column, said hollow convex column being formed with a switch pin, the top of said stagger unit being formed with at least a stop block corresponding to said stop piece, wherein one of said stop blocks being formed with a stop column, when said switch pin being at a first position, said stop piece being abutted against said stop column, thereby allowing said first rubber member to provide a first stiffness to said writing tip, when said switch pin being transversally moved to a second position, said stop column and said stop piece being staggered, thereby allowing said second rubber member to provide a second stiffness to said writing tip.

2. The pen-shaped input device having variable stiffness of writing tip as claimed in claim 1, wherein the center of said support is formed with at least a protrusion, said printed circuit board is formed with a slit corresponding to said protrusion thereby enabling said printed circuit board to be fastened on said support.

3. The pen-shaped input device having variable stiffness of writing tip as claimed in claim 2, wherein the bottom of said support is formed with a chamber allowing one end of said first rubber member to be received.

4. The pen-shaped input device having variable stiffness of writing tip as claimed in claim 1, wherein the interior of said pen head and the interior of said hollow barrel are respectively formed with threads, and one end of said linear shaft is further formed with threads thereby enabling to be fastened in said hollow barrel.

5. The pen-shaped input device having variable stiffness of writing tip as claimed in claim 1, wherein said first rubber member is a hard rubber member, said second rubber member is a soft rubber member, and the stiffness of said first rubber member is greater than that of said second rubber member.

6. The pen-shaped input device having variable stiffness of writing tip as claimed in claim 1, wherein said switch unit is formed with four stop pieces arranged with equal intervals, said stagger unit is formed with four stop blocks arranged with equal intervals, wherein two of said stop blocks arranged with a diagonal manner are formed with said stop column.

7. The pen-shaped input device having variable stiffness of writing tip as claimed in claim 4, further including a housing formed as hollow, one outer end of said housing is formed with threads thereby being enabled to be fastened in said pen head, moreover, said housing is formed with a slide groove corresponding to said switch pin thereby allowing said switch pin to be exposed and be transversally moved.

8. A pen-shaped input device having variable stiffness of writing tip, at least including:
- a housing formed as hollow;
- a writing tip altering switch disposed in said housing, said writing tip altering switch at least including a stagger unit, a rubber member and a switch unit, and said switch unit being enabled to be selectively abutted against said stagger unit or against said rubber member;
- a writing tip unit disposed in said housing, and said writing tip unit being mutually abutted with said stagger unit; and
- a pen head mutually connected with said housing, and the interior of said pen head being formed with a round hole thereby allowing said writing tip unit to be exposed from said round hole.

9. The pen-shaped input device having variable stiffness of writing tip as claimed in claim 8, wherein said rubber member is disposed between said stagger unit and said switch unit.

10. The pen-shaped input device having variable stiffness of writing tip as claimed in claim 9, wherein said switch unit is formed with at least a stop piece, and said stop piece is formed with at least a switch pin, said stagger unit is formed with at least a stop column, said switch pin is served to selectively allow said stop piece to be abutted against said stop column or against said rubber member.

11. The pen-shaped input device having variable stiffness of writing tip as claimed in claim 10, wherein said writing tip unit at least includes:
- a hollow ferrite core disposed in said housing, and said hollow ferrite core is mutually abutted with said stagger unit; and
- a writing tip, one end thereof is exposed from said round hole of said pen head, the other end thereof is received in said hollow ferrite core.

* * * * *